United States Patent
Schoonenberg et al.

(10) Patent No.: US 11,251,604 B2
(45) Date of Patent: Feb. 15, 2022

(54) VOLTAGE TRANSFORMER

(71) Applicant: Eaton Intelligent Power Limited, Dublin (IE)

(72) Inventors: Gerard Cornelis Schoonenberg, Hengelo (NL); Johanna Maria Elisabeth Morskieft, Hengelo (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 724 days.

(21) Appl. No.: 16/208,636

(22) Filed: Dec. 4, 2018

(65) Prior Publication Data
US 2019/0173275 A1 Jun. 6, 2019

(30) Foreign Application Priority Data
Dec. 4, 2017 (GB) .................................. 1720151

(51) Int. Cl.
| | |
|---|---|
| *H02H 7/04* | (2006.01) |
| *H01F 27/28* | (2006.01) |
| *H01F 27/40* | (2006.01) |
| *H02H 3/02* | (2006.01) |

(52) U.S. Cl.
CPC .............. *H02H 7/04* (2013.01); *H01F 27/28* (2013.01); *H01F 27/402* (2013.01); *H02H 3/023* (2013.01)

(58) Field of Classification Search
CPC .......... H02H 7/04; H02H 3/023; H01F 27/28; H01F 27/402
See application file for complete search history.

(56) References Cited

U.S. PATENT DOCUMENTS

| | | | | |
|---|---|---|---|---|
| 2,544,917 | A * | 3/1951 | Gordon | B64F 1/28 141/94 |
| 4,312,022 | A * | 1/1982 | Bailen | H02H 3/162 361/46 |
| 5,400,223 | A * | 3/1995 | Speaker | F21V 25/04 362/21 |
| 2004/0080878 | A1* | 4/2004 | Brollo | H05B 41/2851 361/38 |
| 2009/0021874 | A1* | 1/2009 | Divito | H02H 3/023 361/57 |
| 2011/0115449 | A1* | 5/2011 | Schluter | H02M 1/36 323/238 |
| 2017/0350927 | A1* | 12/2017 | Gabrielsson | B60L 53/50 |

OTHER PUBLICATIONS

NPL-European Patent Grant Apr. 23, 2020 (Year: 2020).*

* cited by examiner

*Primary Examiner* — Elvin G Enad
*Assistant Examiner* — Malcolm Barnes
(74) *Attorney, Agent, or Firm* — Leydig, Voit & Mayer, Ltd.

(57) ABSTRACT

A voltage transformer includes: a body with primary windings and secondary windings coupled to each other by electromagnetic induction; a measuring device electrically connected to the secondary windings via a first fuse; and a relay having a coil and at least one pole with normally open contacts, the at least one pole being configured to be thrown by an energizing of the coil. The coil is arranged in series with the primary windings. The at least one pole with normally open contacts is arranged between the secondary windings via the first fuse in order to short circuit the first fuse when the at least one pole is thrown.

6 Claims, 2 Drawing Sheets

VOLTAGE TRANSFORMER

CROSS-REFERENCE TO PRIOR APPLICATION

Priority is claimed to British Patent Application No. GB1720151.8, filed on Dec. 4, 2017, the entire disclosure of which is hereby incorporated by reference herein.

FIELD

The invention relates to a voltage transformer comprising:
a body with primary windings and secondary windings coupled to each other by electromagnetic induction;
a measuring device electrically connected to the secondary windings via a first fuse.

BACKGROUND

Voltage transformers are typically used to decrease or step-down high voltages, which are used in the transport of electricity, to low voltages, e.g. 230 V or 400 V, which are suitable for electrical appliances used in homes and factories, or are used as a measuring voltage transformer, with a secondary output voltage of e.g. 110, 110/√3 or 100V (with the transformation ratio is based on the rated primary voltage), suitable for the measuring device to handle.

When the secondary voltage has to be an accurate representative of the primary voltage for a specific load range, e.g. as needed for energy measurement, the impedance of the secondary circuit, including the windings must be kept as low as possible to allow the measuring to be as accurate as possible, within a range of loads of the measuring devices.

Typically, a low impedance fuse is also provided to the secondary winding for high overcurrents (e.g. as short circuit protection), wherein the secondary windings would fail at overcurrents for which the fuse will not react. Even if the current does not increase too much, the temperature of the voltage transformer could increase too much also causing the voltage transformer to fail. This low impedance of the fuse implies a rather high interrupting value, so often there will be a region of too high overcurrents that can damage the voltage transformer, but cannot be interrupted by the fuse.

US 2004080878 discloses a transformer, which has connected to the primary windings a circuit control logic which determines whether a threshold of the current in the secondary circuit has been exceeded. In such an occasion the current in the primary windings is interrupted by the circuit control logic to protect the secondary circuit.

However, for a voltage transformer, which is connected with the primary windings to high voltage, the control logic must be isolated otherwise it will be damaged. Furthermore, the control logic complicates the voltage transformer increasing the manufacturing costs.

SUMMARY

In an embodiment, the present invention provides a voltage transformer, comprising: a body with primary windings and secondary windings coupled to each other by electromagnetic induction; a measuring device electrically connected to the secondary windings via a first fuse; and a relay having a coil and at least one pole with normally open contacts, the at least one pole being configured to be thrown by an energizing of the coil, wherein the coil is arranged in series with the primary windings, and wherein the at least one pole with normally open contacts is arranged between the secondary windings via the first fuse in order to short circuit the first fuse when the at least one pole is thrown.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
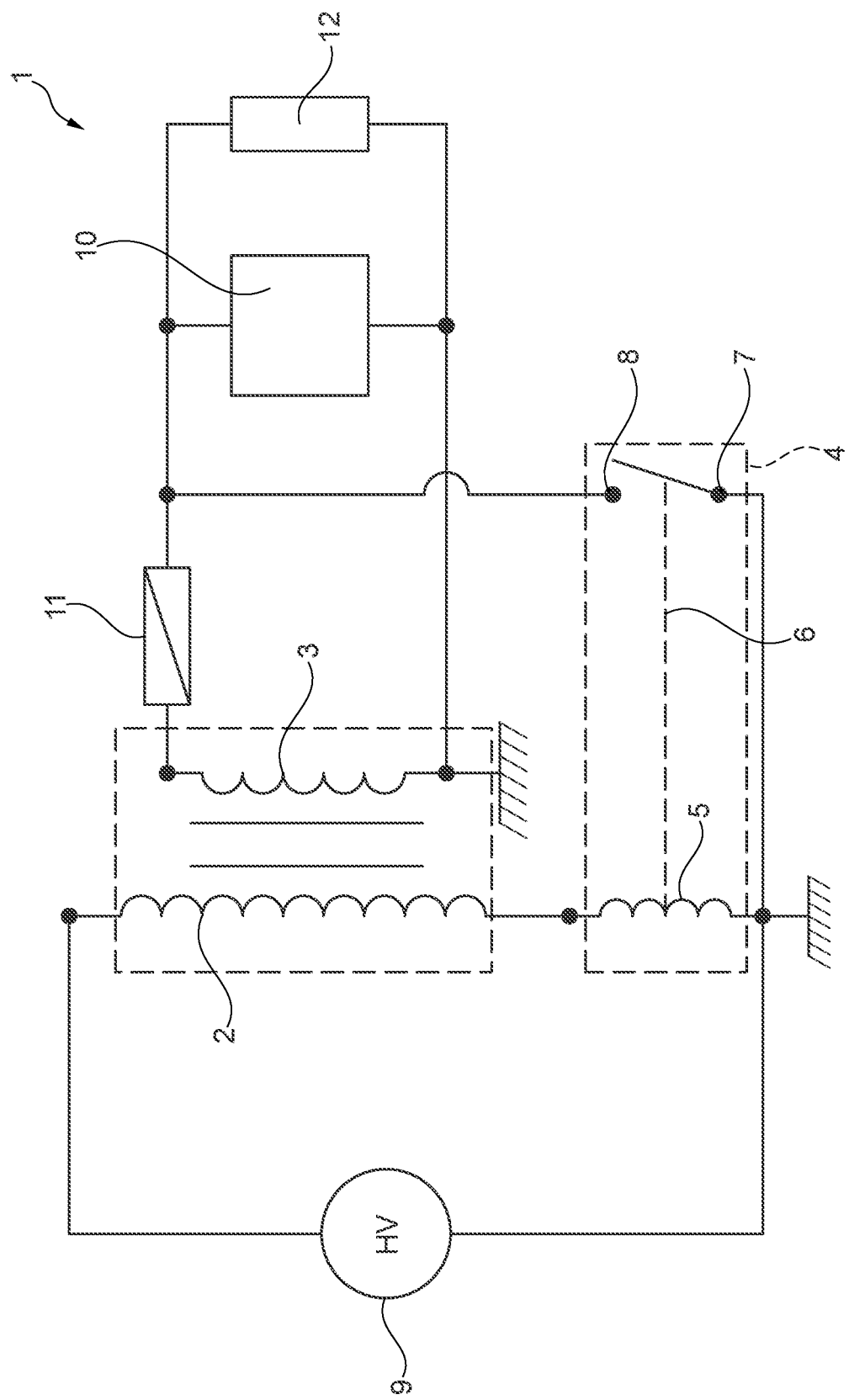
FIG. 1 shows an electrical diagram of a first embodiment of a voltage transformer according to the invention.

This object is achieved with a voltage transformer according to the preamble, which is characterized by a relay having a coil and at least one pole with normally open contacts, wherein the at least one pole is thrown by energizing the coil, wherein the coil is arranged in series with the primary windings and wherein the at least one pole with normally open contacts is arranged between the secondary windings via the first fuse in order to short circuit the first fuse when the pole is thrown.

With the voltage transformer of the invention, the primary windings provide a current source for the coil of the relay. By designing the primary windings and the coil of the relay correctly, the impedance of the relay coil could be neglected compared to the impedance of the primary windings, such that for a voltage source, the addition of the relay coil has no significant impact.

When the current in the second windings increases the current in the primary windings will also increase. By designing the relay and tuning the coil of the relay, it is possible to have the relay throw the at least one pole at a lower current in the secondary windings, than a current which would blow the first fuse.

When the at least one pole is thrown, the contacts of the pole will provide a short circuit, such that the first fuse is blown without further impeding the secondary windings, the measuring device or the load connected to the secondary windings.

As soon as the first fuse is blown, the current in the secondary windings and therefore in the primary windings will be zero (the remaining magnetizing current of the primary winding can be neglected), such that the relay moves back to its rest position, wherein the contacts are normally open.

A preferred embodiment of the voltage transformer according to the invention further comprises a second fuse arranged parallel with the coil of the relay in order to aim for even higher accuracy in the voltage transformation.

To reduce any possible voltage drop across the impedance of the relay coil, which could influence the accuracy of the voltage transformer system, a second fuse can be arranged parallel to the coil. As a result, the parallel path through the fuse reduces the voltage drop across the coil to a very low value. When the primary (HV) current exceeds a certain value (due to an overload on the secondary side), this second fuse will blow, forcing the HV primary current to flow through the coil and making the contacts of the relay to close. Depending on the current in the secondary windings, the coil of the relay will be energized after the second fuse has blown, resulting in the first fuse to blow, such that when the voltage transformer is used again, both first and second fuses need to be replaced.

In a further embodiment of the voltage transformer according to the invention, the coil of the relay is electrically arranged with one end to ground and with the other end to the primary windings.

Preferably, one end of the secondary windings is electrically arranged to ground and the other end of the secondary windings is electrically arranged to the first fuse.

Yet a further preferred embodiment of the voltage transformer according to the invention further comprises an impedance (e.g. resistor) arranged in series between the first fuse and the at least one pole of the relay.

When the pole is thrown and the contacts close to short circuit the first fuse, the current in the short circuit could become very high, such that the contacts of the relay are damaged. By providing an impedance (resistor) in series in the short circuit path, the short circuit current is limited, but still high enough to let the first fuse blow within a desired time.

In FIG. 1 a first embodiment 1 of a voltage transformer according to the invention is shown. The voltage transformer 1 has primary windings 2 and secondary windings 3, which are coupled to each other by electromagnetic induction.

The voltage transformer 1 is furthermore provided with a relay 4 comprising a coil 5 and a pole 6 with contacts 7 and 8. The contacts 7 and 8 are normally open in the sense that, the circuit is open until actuated and when the relay 4 is actuated, the circuit is closed by creating an electrical connection between contacts 7 and 8. The coil 5 is arranged in series with the primary windings 2 and this combination is supplied with a high voltage source 9.

A measuring device 10 is electrically connected to the secondary windings 3 via a fuse 11 to monitor the voltage in the secondary circuit.

The contact 8 is electrically connected between the fuse 11 and the measuring device 10, such that up on closure of the contacts 7 and 8 a short circuit is provided over the fuse 11.

When for example the load 12, as a result of a short circuit, additional device or high ohmic resistance, draws too much current from the secondary windings, the current in the primary windings will increase and cause the coil 5 of the relay 4 to be energized. When the coil 5 is energized, the pole 6 will be thrown and the contacts 7 and 8 will close, such that the fuse 11 in the secondary circuit will blow and potential damage to the secondary windings 3 is prevented.

For example the relay 4 is a low voltage relay (e.g. a 12, 24 or 48 V), which would need a current of about 40 to 100 mA to throw the pole 6 and close the contacts 7 and 8. With such a low voltage relay 4, the primary windings 2 of the voltage transformer 1 can be seen as a current source for the coil 5 of the relay 4. The impedance of the coil 5 would be neglectable compared to the impedance of the primary windings 2.

The rated voltage of the relay 4 should be as low as possible in order not to create a too large influence on the accuracy. For example, a measurement device 10 brings in a load of only a few VA, so at a nominal 57V secondary voltage of the voltage transformer 1, this results in only about 40 mA secondary current.

The resulting current in the primary circuit will typically be a factor 100 to 200 less for medium and high voltage power sources 9. Assuming a total load by the measurement device 10 and the load 12 of 15 VA the primary current will be less than 10 mA. When the overload in the secondary circuit is stated at 4 A (230 VA), then the current in the primary circuit will be about 20 to 40 mA on which the relay 4 should be energized and throw its pole 6 closing its contacts 7 and 8.

Figure 2:
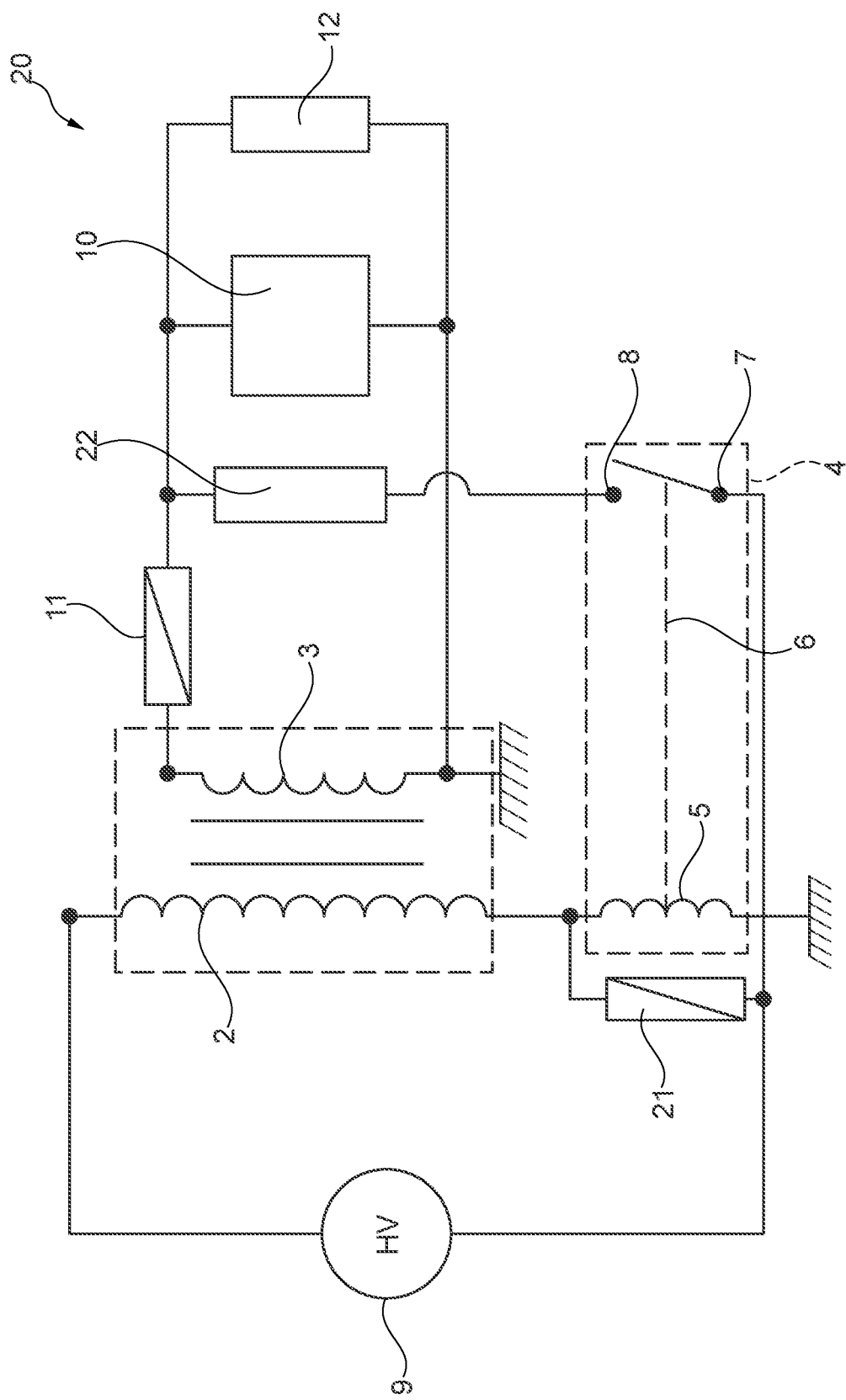
FIG. 2 shows an electrical diagram of a second embodiment of a voltage transformer according to the invention.

FIG. 2 shows a second embodiment 20 of a voltage transformer according to the invention. This second embodiment resembles the first embodiment 1 and similar parts are designated with the same reference signs.

In order not to disturb the accuracy of the voltage transformer 20, a second fuse 21 (of for example 20 mA) is arranged in parallel with the coil 5 of the relay 4. This reduces or even removes the impact of the impedance of the coil 5, such that the accuracy of the voltage transformer 20 is less or not disturbed by the relay 4.

Instead of the second fuse 21, one could of course also provide other provisions in parallel to the coil 5, such as RC snubbers to increase the electromagnetic compatibility (EMC), or just a resistor in parallel in order to have a continuous detour path if the sensitivity should be lowered, or a surge arrestor (ZnO, or spark tube) to react on overvoltages etc.

The voltage transformer 20 further has a resistor 22 arranged in series between the first fuse 11 and the pole 6 of the relay 4. This resistor 22 ensures that the short circuit current, when the contacts 7 and 8 close, will not be so high as to damage the contacts 7 or 8.

Without the resistor 22 and with a nominal secondary voltage of 57V, the current in the short circuit, before fuse 11 blows, could get as high as 75 A.

If for example the short circuit current would be limited by the resistor 22 to about 20 A, the fuse 11 (of typically a prescribed 6 A nominal continuous current) will still blow in about 0.4 s. This is generally quick enough, while the contacts 7 and 8 of the relay 4 now are protected.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A voltage transformer, comprising:
   a body with primary windings and secondary windings coupled to each other by electromagnetic induction;
   a measuring device electrically connected to the secondary windings via a first fuse; and
   a relay having a coil and at least one pole with normally open contacts, the at least one pole being configured to be thrown by an energizing of the coil,
   wherein the coil is arranged in series with the primary windings, and
   wherein the at least one pole with normally open contacts is arranged between the secondary windings via the first fuse in order to short circuit the first fuse when the at least one pole is thrown.

2. The voltage transformer according to claim 1, further comprising a second fuse arranged parallel with the coil of the relay.

3. The voltage transformer according to claim 1, wherein the coil of the relay is electrically arranged with one end to ground and with an other end to the primary windings.

4. The voltage transformer according to claim 3, wherein one end of the secondary windings is electrically arranged to ground and on other end of the secondary windings is electrically arranged to the first fuse.

5. The voltage transformer according to claim 1, further comprising an impedance arranged in series between the first fuse and the at least one pole of the relay.

6. The voltage transformer according to claim 5, wherein the impedance comprises a resistor.

\* \* \* \* \*